Jan. 23, 1973  PER BRO ET AL  3,712,836
SOLID ELECTROLYTE CELL PACKAGING DEVICE
Filed Nov. 18, 1970
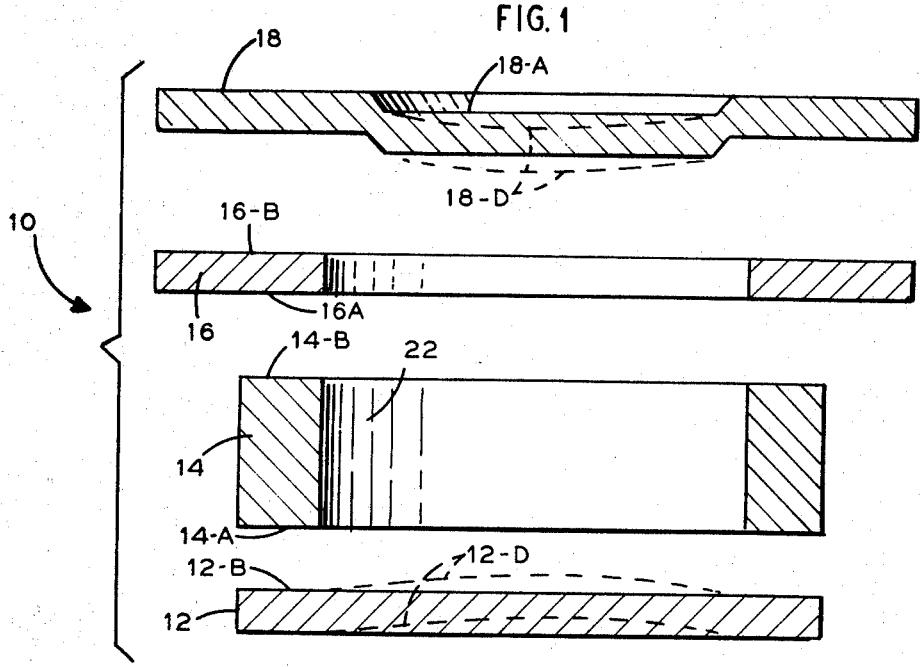
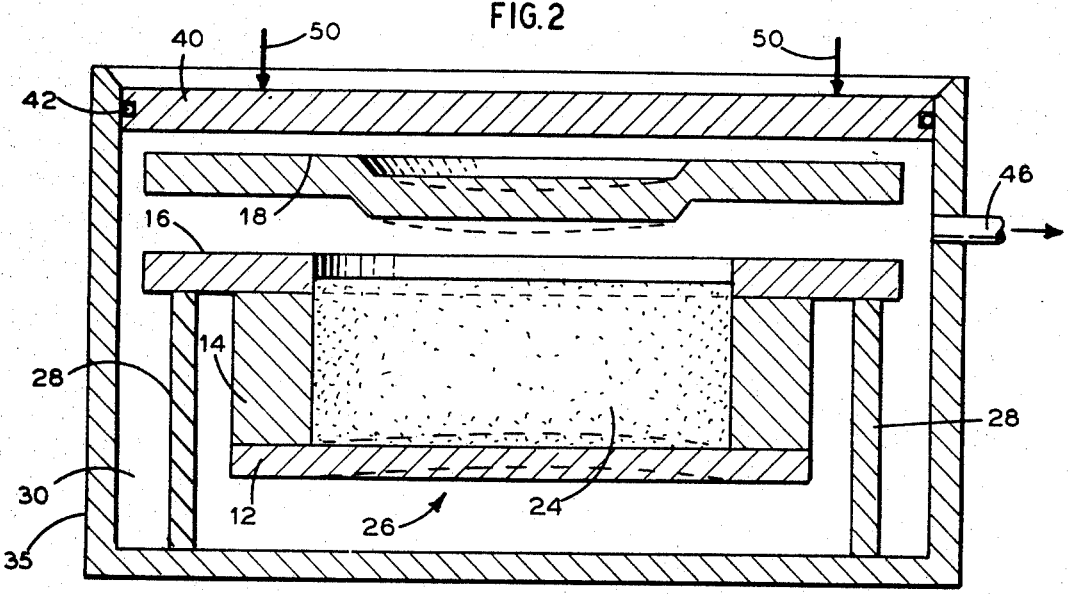
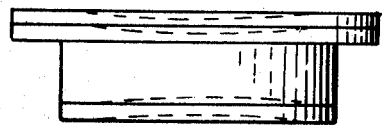
INVENTORS
Per Bro
Gerard Henry Boyle
Charles Chi Liang
BY *Robert Levine*
ATTORNEY 3,712,836
SOLID ELECTROLYTE CELL PACKAGING
DEVICE
Per Bro and Charles C. Liang, Andover, and Gerard H.
Boyle, West Concord, Mass., assignors to P. R. Mallory
& Co., Inc., Indianapolis, Ind.
Filed Nov. 18, 1970, Ser. No. 90,511
Int. Cl. H01m 1/00
U.S. Cl. 136—166                                                     5 Claims

ABSTRACT OF THE DISCLOSURE

A hermetically sealed packaging container for a solid electrolyte cell, in which the container has two walls spaced and insulated from each other, and arranged to provide and serve as separate electrical contacts for the cell. The sealed container is evacuated, whereby the differential pressure between the evacuated atmosphere within the container and the normal pressure outside of the container will maintain good electrical contact between the two walls and the anode and the cathode materials.

---

This invention relates to a hermetically sealed cell packaging device or container for solid electrolyte batteries, and relates further to a process of assembly which provides electrical contacts to the electrodes for the cell without using mechanical springs, but relying substantially on differential pressures between evacuated internal pressure in the container, and normal standard external pressure.

Miniaturization in electronics has been rapidly advancing in recent years and has resulted in increased demand for special power sources characterized by small or reduced volume and weight comparable to those of electronic components employed in the circuitry. Some degree of success in meeting this demand has been achieved by employing solid electrolyte cells. Apart from the advantage of miniaturization, solid electrolyte cells and batteries permit great flexibility in design and possess extremely long shelf-life of the order of five to ten years.

One of the current problems has been how to establish good contact of low resistance between the electrode and a surface of a container within which a cell of solid electrolyte will be disposed. Adequate electrical contact must be established with certain external surfaces of the cell container that are to serve as terminals to an external circuit. Present conventional practice utilizes a helical spring to establish such contact between the electrode and a selected surface of the enclosure, with the compression force of the spring being utilized to establish good contact of low electrical resistance. A disadvantage of that type of construction is that good pressure contact requires a strong spring and the compression force of the spring is in a direction to tend to open the cell container.

A primary object of this invention is to provide a cell closure construction as a container, in which the use of a spring is eliminated, and, instead, a vacuum condition is established and utilized within the container, which tends to establish a force in a direction to aid in maintaining the enclosure closed, without generating any force internally that would tend to open the enclosure.

It is an object of the present invention to improve solid electrolyte cells.

It is a further object of the present invention to provide novel and improved high energy solid electrolyte cells and batteries having an extremely long shelf-life, a large and continuous output of electrical energy for its size, and which may be readily manufactured and sold on a practical and commercial scale at a low cost.

Another major problem in packaging such miniaturized batteries is that solid electrolyte batteries with active electrodes and/or hygroscopic electrolytes such as Li/LiI/CuI, Li/LLA/CuI cells (where "LLA" stands for a solid electrolyte containing LiI, LiOH, $Al_2O_3$) must be hermetically sealed to prevent air and moisture from entering the interior of the battery. The problem, of course, is to provide a suitable packaging device that may be hermetically sealed to preserve the condition of the solid electrolyte cell from external air and moisture.

A further object of this invention to provide a simple packaging structure for enclosing electric cells in an evacuated or subnormal pressure atmosphere, with the enclosure throughout its operating life, and to aid in maintaining the original hermetic seal.

Another object of the invention is to provide a hermetically sealed evacuated enclosure for a solid electrolytic cell, in which the enclosure is constructed to embody two elements that are held pressed against the electrodes to establish relatively high pressure contacts with the electrodes, such pressure being due substantially to the differential pressure between the evacuated condition within the enclosure, and external atmospheric pressure and thereby ensure low contact resistance for the cell.

Another object of this invention is to provide a simple method of constructing an evacuated and hermetically sealed enclosure for a solid electrolyte cell, that enables the cell to be manufactured simply and at relatively low cost.

The enclosure, according to this invention, embodies a simple sheet or plate disc, preferably circular, upon which a hollow cylindrical annulus or ring of electrically insulated material is disposed and suitably bonded to the metallic base, with a metallic washer seated on and bonded to the top surface of the annular insulating ring, all of which provide an internal chamber to receive the active components of a solid electrolyte cell or a solid state battery in an atmosphere that is then evacuated, after which a top closure disc is seated on the washer and suitably sealed and bonded thereto to close the structure while in the low pressure atmosphere, so the bottom disc and the top cover disc will tend to be pressed inwardly to engage the electrodes by the pressure differential between low-pressure atmosphere within the enclosure and the normal atmospheric pressure external to the enclosure.

The details of construction of such cell and closure device of this invention, for a solid electrolyte cell, and the method by which said closure device is assembled, are all desscribed in more detail in the following specification, taken together with the accompanying drawings, in which FIG. 1 is an exploded view showing the several structural elements of the container of the cell;

FIG. 2 is a vertical sectional view of the cell, with the active components of the solid electrolyte cell or the solid state battery in place, and illustrates schematically the method and mechanical arrangement for assembling the evacuated container of the assembled cell; and FIG. 3 is a similar view showing the completed cell and the container, with the bottom wall and the top wall of the container shown in pressure contact with the active components of the cell due either to initial pressure in assembly, or due to differential pressure between the internal vacuum and the external normal atmospheric pressure, after closure and sealing of the container.

Generally stated, in accordance with the principles of the present invention, an enclosure or container for the solid electrolyte cell embodies two walls insulated from each other and arranged to engage the electrodes of the cell, with a step in the assembling operation which serves to evacuate the air from the cell container, so that, upon complete assembly and closure, the two walls which are assembled in normal engagement with the solid electrolyte cell will be subjected to the differential pressure between the reduced pressure within the container and the normal atmospheric pressure on the outside of the container.

As shown in FIG. 1, which shows an exploded view of the elements of the enclosing container 10, those elements comprise a thin sheet metal base 12, a cylindrical annular ring 14 of electrically insulating material, a metallic washer 16, and a metal top cover disc 18. The cylindrical annular ring 14 is of appropriate dimension to seat on the base 12 and is adapted to be bonded at and along its bottom surface 14-A to the base sheet 12 with a hermetic seal bond. The insulating annular ring 14 is provided with a central space 22, which has an appropriate diameter and volume that will be sufficient, with the additional central space within said washer 16, to receive and accommodate a solid electrolyte cell or a solid state battery 24, as shown in FIG. 2, of volume to fill that space when the container is closed. The dotted lines 18-D and 12-D merely imply a tendency of the top cover disc 18 and of the sheet metal base 12 to bulge inwardly when the inside of the assembled container is evacuated to a lower internal atmospheric pressure, to be explained below.

In manufacturing assembly, the washer 16 is seated on the annular insulating ring 14 and is bonded thereto with a hermetic seal at and along the top surface 14-B of the annular ring 14.

The solid electrolyte cell (comprising an anode, a cathode and a solid electrolyte therebetween) or solid state battery 24, in the form of a disc or pellet, is then placed in the central space 22 in the annular ring 14, and then the metal top cover disc 18 is placed in position on the metal washer 16, while the air is evacuated from the container, as the container is being assembled. The cover disc 18 is bonded to the top surface 16-B of the metal washer 16 by a cold pressure welding process to establish a bond and hermetic seal between the top cover disc 18 and the washer 16. The central area 18-A of the cover disc 18 is slightly deformed and depressed to engage the electrode with a slight initial pressure in assembly, independently of the differential air pressure afterward. The cell is now complete and may be withdrawn from the pressure apparatus in which the cell has been assembled.

FIG. 2 shows schematically, a functional apparatus for accomplishing the assembly of the enclosure for the cell, as discussed in connection with the elements of FIG. 1. The base 12 and the annular ring 14 and the washer 16 are first suitably assembled, as a sub-assembly, to provide a hermetic seal at the bonding areas between the annular ring areas 14 and the base 12 and the washer 16. The sub-assembly 26, thus formed, is then seated on a presure abutment ring 28, which serves as a pressure-reaction seat for the border area of the washer 16. The supporting pressure-abutment ring 28 is disposed in a chamber 30 in a mold 35, which serves both as a pressure mold, and as an evacuation chamber in which the air pressure is reduced while the container 10 is being assembled and closed by application of the top cover disc 18.

After the sub-assembly 26 is disposed on the supporting pressure abutment ring 28, the top cover disc 18 is positioned on the sub-assembly 26 and the chamber 30 in the pressure mold 35 is closed by a piston cover 40, provided with a sealing O-ring 42, to fit snugly as a piston into the encircling wall 44 of the pressure mold 35.

When the pressure mold 35 is thus closed by the sealing piston 40, the chamber 30 is evacuated through a suitable evacuation conduit 46, and, at the same time, the air around the solid electrolyte cell in the sub-assembly 26 will be evacuated even though the closure disc 18 may be lightly resting on the washer 16. The central disc area 18-A may be deformed enough to be lightly resting on the electrode to hold the cover disc slightly above the washer. At any rate the evacuating action will be effective before the top cover disc 18 is welded to the washer. The central disc 18-A provides some resiliency that assures initial contact with the electrode and any self-adjustment when pressure is applied to cold-weld the disc to the washer, and, later, when any pressure differential is effective between the evacuated inner region of the container and the normal external atmospheric pressure.

After the chamber 30 is evacuated to the desired degree the piston 40 is then pressed downward at ambient normal temperature to cold-weld the top cover disc 18 to the washer 16, by suitable pressure means indicated by the two arrows 50.

After that cold-weld is accomplished, the evacuating operation is terminated, and normal pressure is restored to the space 30, in the mold 35, so the piston 40 can be removed to provide access to and removal of the assembled cell from the mold 35.

By means of the construction shown, the sub-assembly may be readily and simply and economically formed and assembled, separately from the evacuation and compression chamber in the mold, and the assembling operation in the mold can then be performed in a simple and rapid operation.

The dotted lines in FIGS. 1, 2 and 3 represent merely internal stresses in the top cover disc 18 and in the base 12, that tend to form corresponding bulges in those two elements to assure good pressure contact with the two electrode surfaces. The top cover disc 18 and the base 12 may be of copper, or other metals compatible for their intended function. The insulating ring 14 may be of glass or ceramic to which the bond may be applied by heat and/or pressure to form a hermetic seal.

The details of construction that are shown may be variously modified, to form containers in different shapes and dimensions, without departing from the spirit and scope of the invention as set forth in the claims.

What is claimed is:

1. A combination packaging container and solid electrolyte cell comprising:

a metallic closure disc to serve as a base wall to support a solid electrolyte cell;

a cylindrical annular ring of insulating material seated on and seal-bonded to said base around an area to define a place to accommodate such solid electrolyte cell;

an annular metallic washer-shaper ring seated on and seal-bonded to said cylindrical annular insulating ring;

a top wall comprising a closure disc seated on and seal-bonded to said washer shaped metallic ring;

a solid electrolyte cell in the space between said two walls with said cell being electrically engaged by said two walls, one of said walls contacting the anode of the cell and threby being a negative terminal and the other of said walls contacting the cathode and thereby being a positive terminal;

and wherein the space formed within said container is evacuated to less than normal atmospheric pressure, and the space outside of said container is at normal atmospheric pressure, thereby creating pressure on said two terminal walls to engage the cathode and anode by the difference in pressure.

2. A combination packaging container and solid electrolyte cell as in claim 1 comprising an enclosure having two spaced metallic walls, wherein said two walls are sufficiently resilient and deformable to deform and shift inwardly to engage said solid electrolyte cell or solid state battery between said two walls upon said evacuation due to the reduced internal atmospheric pressure.

3. A combination packaging container and solid electrolyte cell as in claim 2 in which said top wall closure disc embodies an annular border ring to seat on said annular washer, and further embodies a central circular disc portion depressed to fit down into the central open space in said annular washer to readily engage the related surface of an electrode of a solid electrolyte cell in said central open space.

4. A combination packaging container and solid electrolyte cell as in claim 1 in which the active components of said solid electrolyte cell are held between inner surfaces of two parallel electrically conductive elements insulated from each other, and the space between said inner surfaces of said two elements is evacuated to less than normal atmospheric pressure, and the space outside of said two elements is at normal atmospheric pressure.

5. A combination packaging container and solid electrolyte cell as in claim 1 in which an anode, a cathode, and a solid electrolyte therebetween are disposed between said two terminal walls, and the enclosure thus formed is evacuated before closure to render the pressure within the container below normal atmospheric pressure that will obtain externally of the cell, to thereby create pressure on said two walls to engage the cathode and the anode with the difference in pressure.

References Cited

UNITED STATES PATENTS

| | | | |
|---|---|---|---|
| 2,337,678 | 12/1943 | Nowell et al. | 136—175.2 |
| 2,499,239 | 2/1950 | Williams | 136—175 |
| 2,582,973 | 1/1952 | Ellis | 136—166 |
| 2,620,368 | 12/1952 | Ruben | 136—137 |
| 3,184,342 | 5/1965 | Seibel | 136—175 |

WINSTON A. DOUGLAS, Primary Examiner

H. A. FEELEY, Assistant Examiner

U.S. Cl. X.R.

136—6, 83